United States Patent

Rucker

[11] Patent Number: 5,217,185
[45] Date of Patent: Jun. 8, 1993

[54] ABLATIVE SHIELDING FOR HYPERVELOCITY PROJECTILES

[75] Inventor: Michelle A. Rucker, Las Cruces, N. Mex.

[73] Assignee: The United States of America as represented by the Administrator of the National Aeronautics and Space Administration, Washington, D.C.

[21] Appl. No.: 887,674

[22] Filed: May 21, 1992

[51] Int. Cl.$^5$ .............................................. B64D 7/00
[52] U.S. Cl. ................................ 244/121; 244/158 R; 89/36.02
[58] Field of Search ............... 244/121, 158 R, 135 R; 89/36.02, 36.11

[56] References Cited

U.S. PATENT DOCUMENTS

| | | | |
|---|---|---|---|
| 3,649,426 | 3/1972 | Gates, Jr. | 89/36.02 |
| 3,896,758 | 7/1975 | Di Battista | 244/158 R |
| 4,194,431 | 3/1980 | Markus et al. | 89/36.02 |
| 4,925,057 | 5/1990 | Childress et al. | 244/135 R |
| 4,936,528 | 6/1990 | Butner et al. | 244/158 R |
| 5,067,388 | 11/1991 | Crews et al. | 89/36.02 |

*Primary Examiner*—Joseph F. Peters, Jr.
*Assistant Examiner*—Anne E. Bidwell
*Attorney, Agent, or Firm*—Russell E. Schlorff; Guy M. Miller; Edward K. Fein

[57] ABSTRACT

A hypervelocity projectile shield which includes a hollow semi-flexible housing fabricated from a plastic like, or otherwise transparent membrane which is filled with a fluid (gas or liquid). The housing has a inlet valve—similar to that on a tire or basketball, to introduce an ablating fluid into the housing. The housing is attached by a Velcro mount or double-sided adhesive tape to the outside surface of a structure to be protected. The housings are arrayed in a side-by-side relationship and may be in layers and in an over-lapping relationship for complete coverage of the surface to be protected. In use, when a hypervelocity projectile penetrates the outer wall of a housing it is broken up and then the projectile is ablated as it travels through the fluid, much like a meteorite "burns up" as it enters the earth's atmosphere, and the housing is deflated. The deflated housing can be easily spotted for replacement, even from a distance. Replacement is then accomplished by simply pulling a deflated housing off the structure and installing a new housing.

16 Claims, 3 Drawing Sheets

ABLATIVE SHIELDING FOR HYPERVELOCITY PROJECTILES

ORIGIN OF THE INVENTION

The invention described herein was made by an employee of the United States Government and may be manufactured and used by or for the Government of the United States of America for governmental purposed without the payment of any royalties thereon or therefor.

FIELD OF THE INVENTION

This invention relates to a system to ablate hypervelocity projectiles, and more particularly to a system which can be adapted to orbiting spacecraft and Extra-Vehicular Activity personnel for damage protection in the event of impact by a hypervelocity projectile.

BACKGROUND OF THE INVENTION

In space exploration, one of the significant problems to deal with is the ever increasing amount of space debris. The problem of space debris overshadows the natural meteoroid activity for a number of reasons. Man-made debris tends to be more dense (metals, etc.) than natural debris (rock, etc.), therefore, man made debris poses more damage potential. Also, man made space objects can have extremely long orbital life and are subject to collisions while traveling at high velocities. The collision impact of such space debris, in turn, generate smaller debris fragments all of which constitute contaminates in space. The small size debris fragments have a particulate size of 0.01 cm to 1.0 cm and at hypervelocities can cause damage to spacecraft or personnel upon impact. It is generally accepted that anything below about 10 cm isn't trackable, therefore, these small particles are not trackable and constitute an unknown hazard to space operations.

In the context of the present invention the term "hypervelocity" refers to velocities in excess of 2 KM/sec and the term "projectiles" refers to both man-made debris and naturally occurring meteoroids.

Existing solutions to protect space vehicles and personnel from projectiles include "Whipple Bumper" shields which consist of a system of thin aluminum sheets separated by discrete spacings so that hypervelocity projectiles are ablated upon penetration of the sheets. Other materials such as ceramic fabrics or metallic meshes can be substituted for the aluminum sheets.

In a "Whipple Bumper" shield, the parameters of the aluminum sheet thickness and layer spacing define the effectiveness of the shield. For example, a shield that would protect against a 2 mm projectile travelling at 8 km/sec is ineffective against a 5 mm projectile travelling at 2.5 km/sec. Thus, designing shields for a range of projectile sizes, travelling at between 2 and 20 km/sec, becomes a difficult problem.

Additionally, "Whipple Bumper" shields have several other limitations in that:

1. aluminum sheets are heavy, resulting in high launch cost penalties;
2. aluminum sheets are opaque so that, this type of shield cannot be used to protect windows, face shields, or solar arrays;
3. rigid sheets must be custom-designed to cover spherical, or otherwise configured structural shapes;
4. sharp metallic edges pose a hazard to personnel working on or near the shields, particularly in an EVA situation;
5. they require rigid mounting hardware and cannot easily be retrofitted to in-place structures;
6. rigid mounting hardware increases both material and launch costs;
7. many impacts on "Whipple Bumpers" cannot be detected without very close visual inspection; on orbit a costly inspection program is needed to ensure timely replacement of the shields;
8. whipple bumpers are "directional". In order to be most effective, projectile must impact at right angle; and
9. on impact, aluminum whipple bumpers produce "ejecta", that is, more metallic projectiles added to the debris environment.

Variations on the "Whipple Bumper" shield, particularly a ceramic fabric shield, have addressed some of the limitations. Weight and thus cost can be decreased; mounting is simplified; and sharp edges can be eliminated; however, most of the other limitations remain.

In military applications, "reactive" armor is sometimes used to protect vehicles and structures from high velocity projectiles. Such armor mechanically reacts upon impact and redirects impact energy away from the element to be protected. "Reactive" Armor has many of the same limitations as the "Whipple Bumper" shield: it is opaque, it cannot be easily retrofitted to in-place space structures, and it may pose a safety hazard to personnel working on or near it in that it also produces secondary projectiles. Reactive armor is also undesirable for civilian use due to the safety issues involved in transporting the dangerous chemical compounds required; the classified nature of most reactive armor precludes its use for international civilian endeavors; and propulsion issues related to armor reaction can be complicated in a space environment.

It can be appreciated that a simpler, lightweight impact shocking system can have considerable utility as a shield for hypervelocity projectiles.

PRIOR PATENT ART

Butner, et. al. U. S. Pat. No. 4,936,528, relates to a method and apparatus for mitigating orbital debris. In the Butner patent, streams of liquid droplets are directed along a conical intake and serve as a collision medium. Debris traveling at hypervelocity speeds collide with the droplets. Upon collision, the debris is substantially vaporized, with any remaining debris being entrained in the stream of liquid and trapped in the storage unit.

One of the problems for this type of system is the reaction of liquid to space where liquids vaporize in a high vacuum and can form ice which can freeze up the unit. Also, since the liquid is not physically contained, the liquid pressure can not be varied. Also, this device is directional and so projectiles hitting at angle would damage the cone.

Crews et al U. S. Pat. No. 5,067,388 relates to a hypervelocity impact shield system which utilizes multi-layered aluminum sheets at relevant spacings from one another to impact shock and vaporize particles with a density of about 2.7 g/cm$^3$ and maximum impact velocities up to 16 km/s.

SUMMARY OF THE PRESENT INVENTION

In the present invention, the hypervelocity projectile shield includes a hollow semi-flexible housing fabricated from a plastic like, or otherwise transparent membrane which is filled with a fluid (gas or liquid). The housing has an inlet valve—similar to that on a tire or basketball, to introduce an ablating fluid into the housing. The housing is attached by a Velcro (TM) mount or double-sided adhesive tape to the outside surface of a structure to be protected. The housings are arrayed in a side-by-side relationship and may be in layers and in an over-lapping relationship for complete coverage of the surface to be protected.

In use, the empty and deflated housings can be transported to the use location where they can be filled with fluid. Using double-sided adhesive tape or Velcro-type mounts, the housings are positioned as necessary, on a structure without modifying the structure to be protected.

In use, when a hypervelocity projectile penetrates the outer wall of a housing, the impact of outer membrane acts much like a whipple bumper to break up (shock) the projectile. The smaller pieces of the projectile are then easier to ablate as they travel through the fluid, much like a meteorite "burns up" as it enters the earth's atmosphere. The housing is deflated when punctured. The deflated housing can be easily spotted for replacement, even from a distance. Replacement is then accomplished by simply pulling a deflated housing off the structure and installing a new housing.

DESCRIPTION OF THE PRESENT INVENTION

Figure 1:
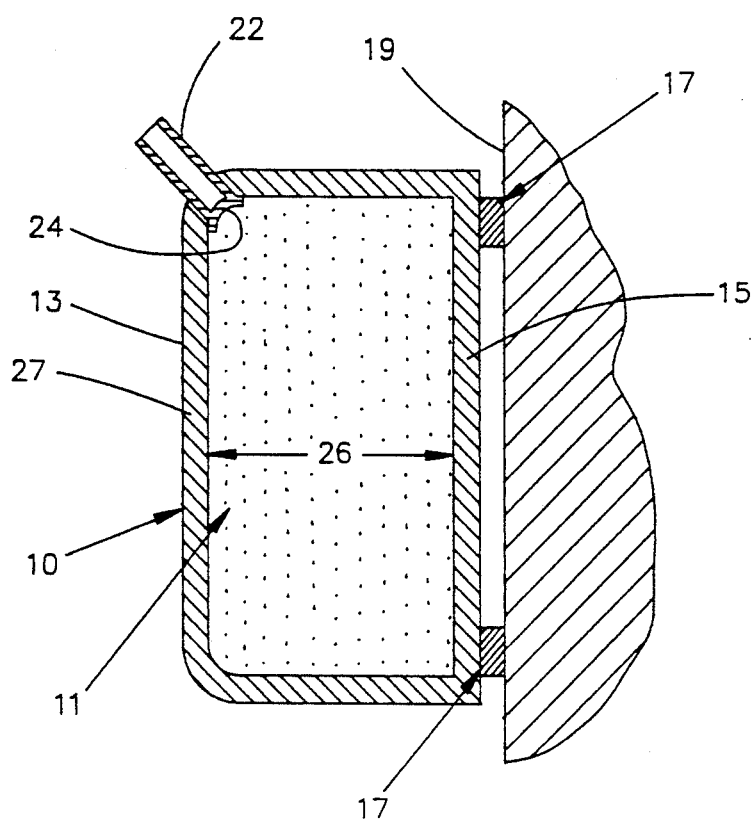
FIG. 1 is a cross-section view through a housing to illustrate the present invention.
Figure 2:
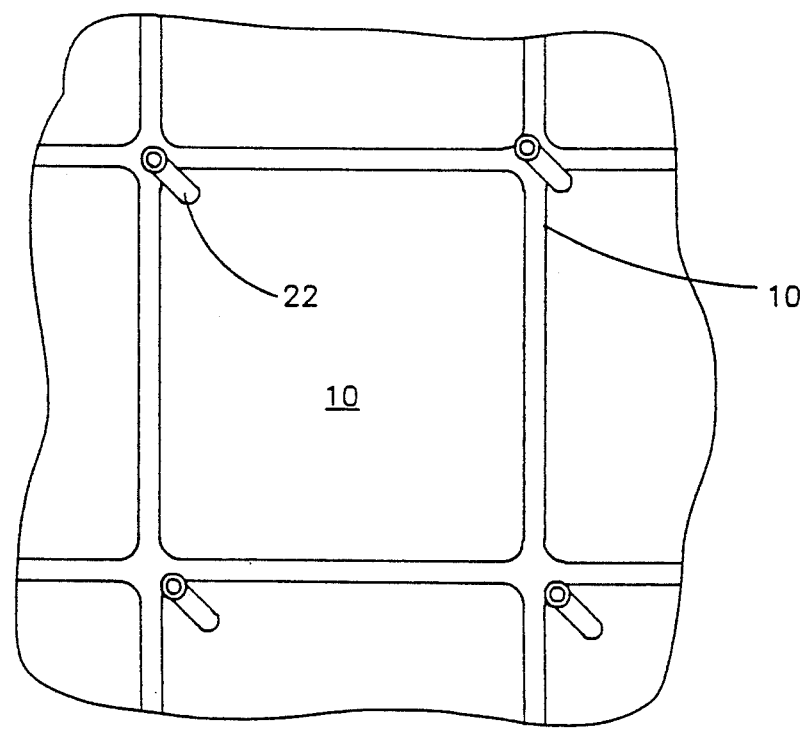
FIG. 2 is a plan view of a housing in accord with the present invention as illustrated in FIG. 1

Referring now to FIGS. 1 and 2, an elongated, rectangularly shaped enclosure or housing 10 is illustrated. The enclosure or housing 10 has a hollow interior for receiving a fluid 11. The walls 13 of the housing are made from a flexible, impermeable and transparent material such as polyethylene or polypropalene. If a transparent shield is not required, then ceramic fabrics can be used for the housing where the fabric is coated to become fluid impermeable. Such a material would also enhance the break-up of an impacting projectile and thus assist in the ablation process. A rearward outside wall 15 of the housing 10, has attachment means 17 such as double sided adhesive or Velcro strips for attachment of the housing 10 to the outer surface 19 of the body to be shielded.

A fill valve 22 is suitably located in the wall of the housing to access the fluid 11 to the interior of the housing 10. A one-way check valve 24 traps the fluid 11 within the housing 10.

Fluids which can be used can include gases, gels or foams as well as liquids. For example, the following fluids are suitable: air, nitrogen, waste gas, waste water, etc. The permeability requirements of the housing 11 can vary according to the fluid selected for use. The fluids used in a space environment are also selected for material compatibility and thermal properties with respect to the environment. An oxygen enriched fluid will enhance the ablation process. On the other hand, space habital waste fluids could be utilized and then usefully disposed.

The material for the housing should also have strength characteristics related to the pressure of the contained fluid. With a high strength material, a higher pressure will enhance the ablative ability of the fluid because a higher pressure produces more friction for an impacting projectile than would a lower pressure. Similarly, density of the fluid is a factor in the ablation abilities of the fluid in that higher density fluids will increase friction on a projectile.

In the use of a housing, a hypervelocity projectile penetrates two different media, i.e. the wall of the housing and the fluid. This penetration of successive shield layers causes a projectile particle to further fragment for greater ablation effectiveness. If desired for some purposes, the fluid can contain a conventional sealing agent which acts to plug a minor penetration of a housing wall.

In construction of the housing, the overall configuration is a matter of choice so long as a sufficient space 26 between a forward wall 27 and the rearward wall 15 is maintained to cause a hypervelocity projectile to ablate. This is important so that the housing 10 can take a projectile impact from virtually any possible direction. Thus, orientation of the housing is not necessary and projectiles approach normal to the face of the housing and enters the fluid 11 which is a collection zone. The space 26 is determined by the parameter of the housing including the wall material, the fluid, internal pressure and the kinetic energy to be absorbed.

One of the important features of the invention is that it is a passive system requiring no power or power collection (such as a solar device) for operation. The system is also simple to utilize with existing structures without modification. Thus, the system can be installed prior to launch or retrofitted to orbiting structures. Where transported, the housings are relatively light weight, can be folded to minimum size and gaseous fillers can be stored prior to launch in a compressed form which reduces transportation costs. Once a housing is filled, no further support requirements are necessary and the system is virtually maintenance free until impacted. Impacted housings can easily be replaced.

One significant feature is the ability to utilize transparent housings to protect solar arrays, windows or face shields. The flexibility of a housing permits mounting on odd shape and even wrap around corners that might otherwise go unprotected, for example, the habitation module on the Space Station Freedom is spherical.

Figure 3:
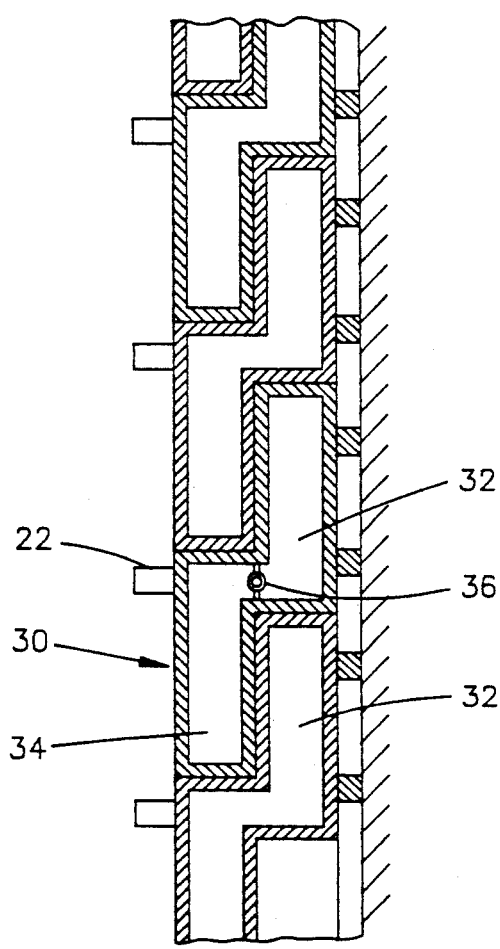
FIG. 3 is a cross-section view through another type of housing configuration for illustrating another form of the invention.
Figure 4:
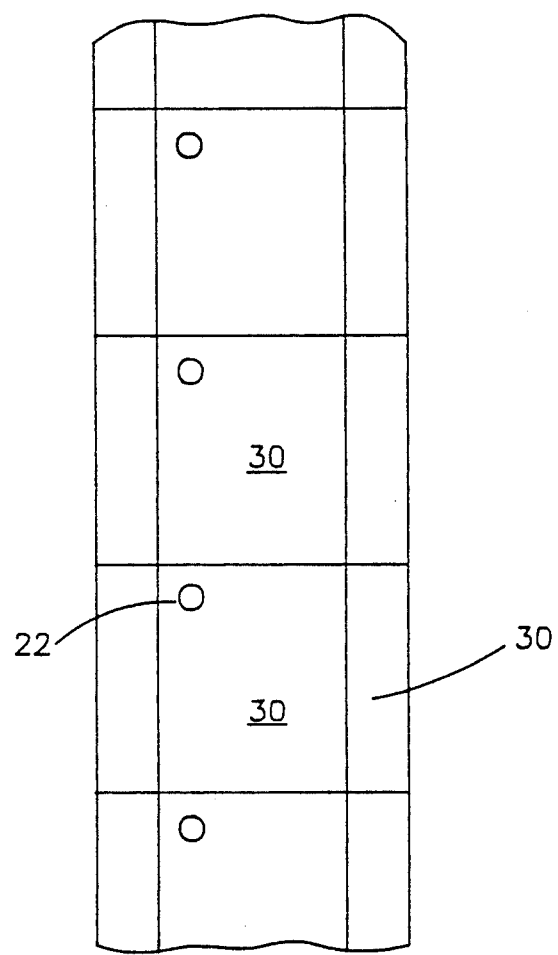
FIG. 4 is a plan view of a housing in accord with the present invention as illustrated in FIG. 3.

In use, construction variations will be readily apparent. For example, as shown in FIGS. 3 and 4, housings 30 can be constructed with laterally offset chambers 32 and 34 so that when installed, layers of the housings are overlapped and layered which would eliminate all unprotected spaces. The inlet valves 22 can be located in an outer wall surface. Further compartmentalization can be achieved by use of a one way valve 36 to connect adjacent, offset chambers in a housing.

Figure 5:
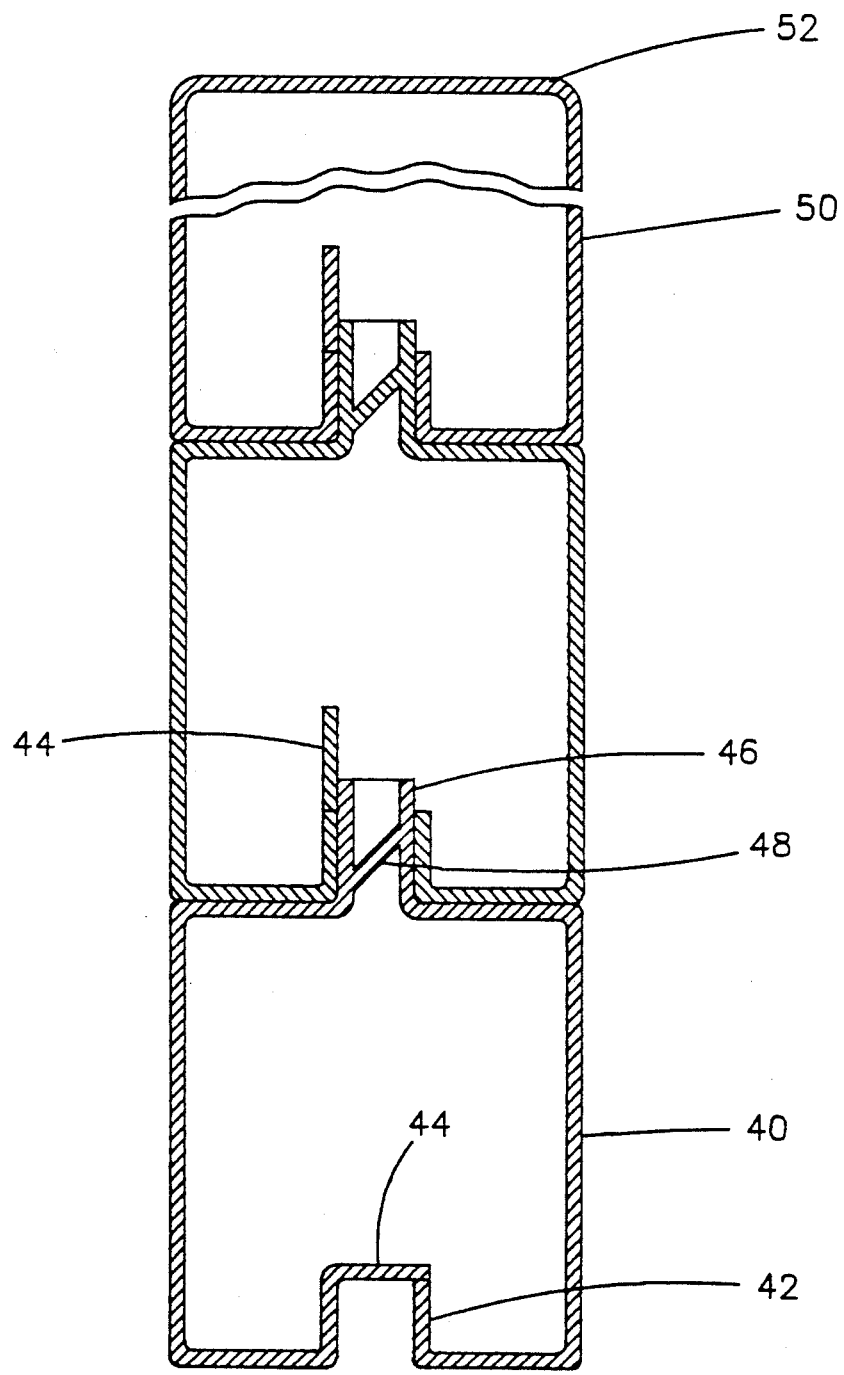
FIG. 5 is a cross section view through another type of housing configuration illustrating still another form of the present invention.

In still another form of the invention, the enclosures can be serially connected so that inflation of a number of housings can be made through a single input port. As shown in FIG. 5, a housing 40 has an end inlet port 42 with a suitable one way valve control such as a flapper element 44 which normally closes the inlet port 42. An inlet port 42 in one housing is accessed by a connecting, in-line probe port member 46 in an adjacent housing. A probe port member 46 has a suitable one way control valve 48. As shown in FIG. 5, fluid can be accessed to the serially connected housings though the probe ports 46 and pass through the control valve into an adjacent housings. The end unit 50 of a series of connected housings has a blank wall 52. With this system, all of the connected housings can be filled at one time and are independent of one another for ablating purposes.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A shield for ablating hypervelocity projectiles in space for preventing damage from projectiles sized from 0.01 cm to 1. cm and traveling at velocities in excess of 2 km/sec, comprising:
   a housing defining an impermeable, flexible, transparent enclosure for containing an ablating fluid, said housing having a forward and rearward wall section at a spacing to define travel path in the interior of the housing;
   a transparent ablating fluid disposed in said housing, said wall sections and ablating fluid being functionally related to ablate a hypervelocity projectile in said travel path; and
   attachment means for releasably attaching said housing to a surface to be protected from hypervelocity projectiles.

2. The shield as set forth in claim 1 above wherein said attachment means includes a double sided adhesive tape.

3. The shield as set forth in claim 1 above wherein said attachment means includes Velcro strips.

4. The shield as set forth in claim 1 wherein said housing is constructed with laterally offset chambers for providing an overlapping relationship with respect to an adjacent housing.

5. The shield as set forth in claim 1 wherein said housing is constructed with inlet and outlet ports, and
   one-way valve means for throughput of fluid through said ports whereby fluid can be transmitted between adjacent housings.

6. The shield as set forth in claim 1 wherein the ablating fluid is oxygen enriched.

7. A shield for ablating hypervelocity projectiles in space for preventing damage from projectiles sized from 0.01 cm to 1.0 cm and traveling at velocities in excess of 2 km/sec, comprising:
   a housing defining an impermeable, flexible enclosure for containing an ablating fluid, said housing having a forward and rearward wall section at a spacing to define travel path in the interior of the housing;
   an ablating fluid disposed in said housing, said wall sections and ablating fluid being functionally related to ablate a hypervelocity projectile in said travel path; said housing being constructed with laterally offset chambers for providing an overlapping relationship with respect to an adjacent housing; and
   attachment means for releasably attaching said housing to a surface to be protected from hypervelocity projectiles.

8. The shield as set forth in claim 7 above wherein said attachment means includes a double sided adhesive tape.

9. The shield as set forth in claim 7 above wherein said attachment means includes Velcro strips.

10. The shield as set forth in claim 7 wherein said housing is constructed from transparent materials and said ablating fluid is transparent.

11. The shield as set forth in claim 7 wherein the ablating fluid is oxygen enriched.

12. A shield for ablating hypervelocity projectiles in space for preventing damage from projectiles sized from 0.01 cm to 1.0 cm and traveling at velocities in excess of 2 km/sec, comprising:
   a housing defining an impermeable, flexible enclosure for containing an ablating fluid, said housing having a forward and rearward wall section at a spacing to define travel path in the interior of the housing;
   an ablating fluid disposed in said housing, said wall sections and ablating fluid being functionally related to ablate a hypervelocity projectile in said travel path; said housing being constructed with inlet and outlet ports, and one-way valve means for throughput of fluid through said ports whereby fluid can be transmitted between adjacent housings; and
   attachment means for releasably attaching said housing to a surface to be protected from hypervelocity projectiles.

13. The shield as set forth in claim 12 above wherein said attachment means includes a double sided adhesive tape.

14. The shield as set forth in claim 12 above wherein said attachment means includes Velcro strips.

15. The shield as set forth in claim 12 above wherein said housing is constructed from transparent materials and said ablative fluid is transparent.

16. The shield as set forth in claim 12 wherein the ablating fluid is oxygen enriched.

* * * * *